United States Patent [19]

Kyle

[11] Patent Number: 5,479,837
[45] Date of Patent: Jan. 2, 1996

[54] GUARD FOR CHANNEL BED PRESSES

[75] Inventor: Kenneth E. Kyle, Madison, Conn.

[73] Assignee: Geo Olcot company, Inc., Scottsboro, Ala.

[21] Appl. No.: 151,868

[22] Filed: Nov. 15, 1993

[51] Int. Cl.⁶ ..................................................... F16P 1/00
[52] U.S. Cl. .......................... 74/608; 100/53; 248/231.41
[58] Field of Search ........................ 74/608–612; 100/53; 248/442.2, 231.4, 231.8

[56] References Cited

U.S. PATENT DOCUMENTS 1,401,672  12/1921  Claussen et al. ................. 248/231.4 X
4,543,021  9/1985  Adler ................................... 74/608 X

*Primary Examiner*—Charles A. Marmor
*Assistant Examiner*—Mary Ann Battista
*Attorney, Agent, or Firm*—Charles Blaich

[57] ABSTRACT

An easily removable transparent guard for channel bed presses which includes a transparent vertical member with support means which are affixed to the channel bed by two spring loaded lineally adjustable members which extend over and interlock with the channel bed.

2 Claims, 5 Drawing Sheets

GUARD FOR CHANNEL BED PRESSES

BACKGROUND OF THE INVENTION

Channel bed hydraulic presses are used in virtually all machine shops, vehicular repair facilities and bearing, transmission, clutch, engine, drive shafts, pumps, etc. manufacturing facilities. Their primary function is to assemble/disassemble press fitted articles such as bearings, clutches, pulleys, transmissions and the like. Channel bed presses generally have two separated channels extending horizontally between two vertical support members and joined at the ends with long bolts. A hydraulic cylinder is supported by a third beam member located above the two channel cross members. The hydraulic beam member and channel bed members are moveable in relationship to each other to adjust to the height of the article being pressed and lineal extension capability of the hydraulic cylinder. Such presses are also known as "H" frame channel bed presses. In operation, separated cross plates are placed over the two channel bed members in such manner that an opening is formed to accommodate the article component that is being pressed from the article's shell. The article is positioned on the crossplate members over the opening and directly under the hydraulic ram. A fitting adapted to the article may be inserted between the article and hydraulic ram. The hydraulic mechanism is activated to apply pressure to the article component to force it out of the article's shell. The reverse, i.e. pressure is applied to the article component to force it into the article shell for assembly of an article.

In many instances articles that have been in service, such as bearings, work harden and become brittle; also in the chemical industry exposure to chemicals may fuse shafts to inner bearing races. Such embrittlement is not obvious even to the experienced operator. Thus, when pressure is applied to separate components they shatter with bullet-like force showering the surrounding area with high speed projectiles which may potentially injure the press operator. Press manufacturing companies literature suggests shielding the press area with plywood and or canvas drop shields, steel collars and the like. These function as shields but hide the article being pressed from the operator's view and control. Therefore many presses are operated without shielding resulting in many injuries and workman's compensation claims.

OBJECT OF THE INVENTION

It is the object of the invention to provide an easily installable/removable transparent shield for channel bed presses.

It is another object of the invention to provide an easily installable/removable transparent shield that can readily be adjusted to a range of sizes of channel bed presses.

It is yet another object of the invention to provide an easily installable/removable transparent shield that requires no permanent mounting to the channel bed press.

None of the prior art found in a preliminary search for patentability disclosed any guard for H Frame channel bed presses nor the simplicity of installation/adjustment/removal of the instant invention.

SUMMARY OF THE INVENTION

In simplest form the instant invention utilizes a rectangular shield of high impact transparent material which is fastened to two vertical support members affixed to a horizontal support. Two lineally adjustable perpendicular members are affixed to the horizontal support. These members have hooked ends designed to extend over and engage the rear channel on the channel bed of the press. The front channel on the press bed is engaged by two spring-loaded plungers which are incorporated into the shield's horizontal support.

In operation the two adjustable perpendicular members are lineally adjusted to accommodate a given press bed. Once adjusted the operator places the shield over the press and engages the hooked ends with the rear channel member, the two spring-loaded plungers are pulled toward the operator until their ends clear the front channel; at which time the plungers are released, moving forward to engage the front channel thereby locking the shield in place.

Removal is accomplished by pulling the plungers until the front channel is cleared, then lifting the shield to clear the rear channel and lifting off the press bed.

DETAILED DESCRIPTION

Figure 1:
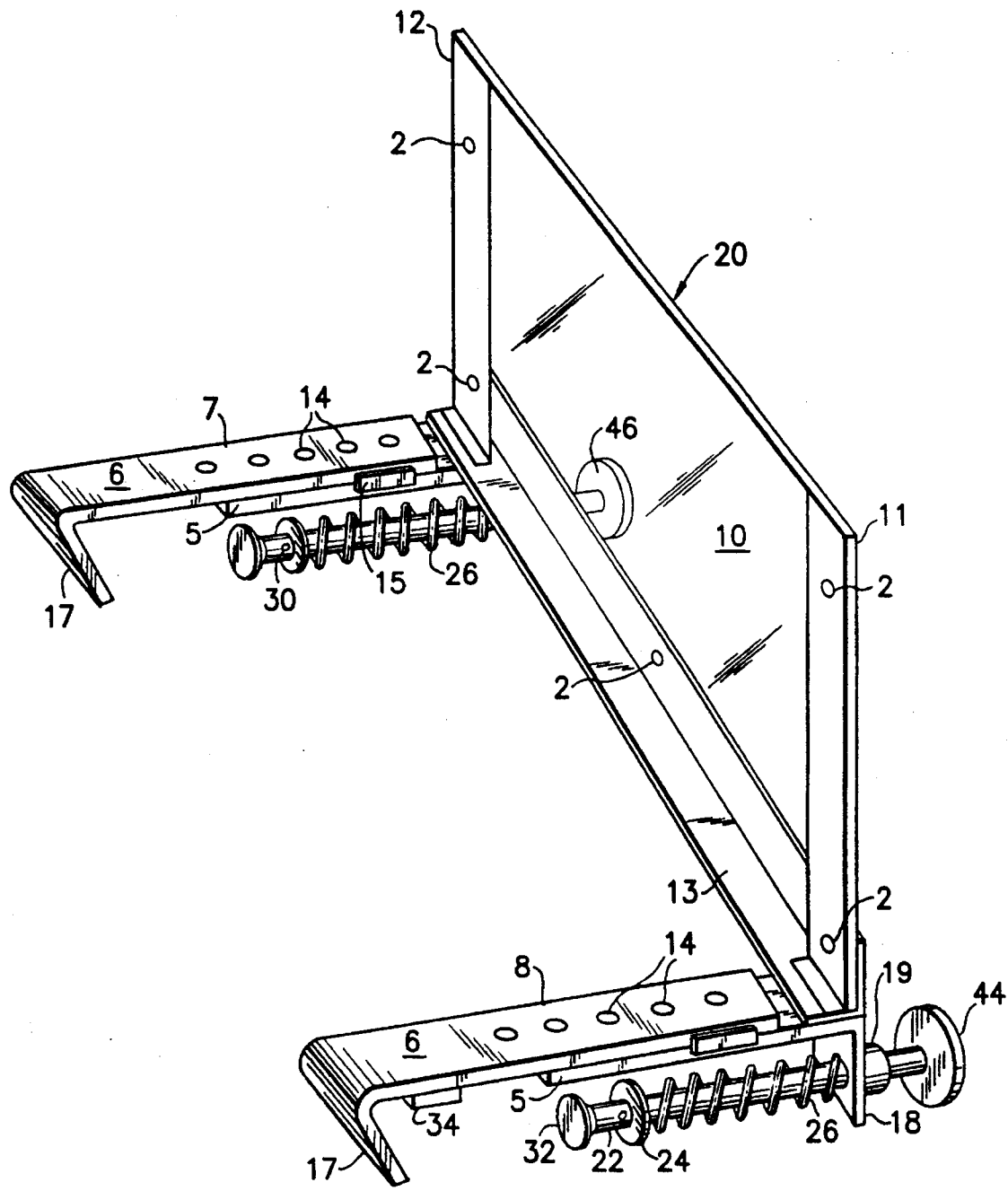
FIG. 1 is a perspective view from the rear of the channel bed press guard.

In FIG. 1 channel bed H frame press guard 20 is shown in detail wherein transparent unbreakable shield 10 is supported by two vertical members 11 and 12 and a channeled horizontal support member 13. Transparent shield 10 is affixed to vertical members 11 and 12 and in the channel in horizontal support member 13. Affixing means may be bolt and nut which pass through holes 2 and are affixed in conventional manner. Affixation to vertical members may also be accomplished by adhesives in which case holes 2 are not required. Rivets passing through holes 2 may also be used as may the technique of tapping holes 2 and inserting bolts therein. Vertical members 11 and 12 are affixed to horizontal support member 13 by welding although alternative fastening methods may be used.

Horizontal support member 13 is affixed to two lineally adjustable perpendicular members 7 and 8 respectively, each of which are made up of two members, a top member 6 and bottom member 5. Top members have a series of holes 14 equidistant of each other through which a bolt may be passed through and into and through a hole (not shown) in bottom members. Slide members 15 are affixed to the sides of top members so as to extend over the bottom perpendicular member which when fastened together at one point prevents sideways motion. This may also be accomplished by fastening top and bottom members at two points some distance from each other.

Adjustment of the lineal length of side members is achieved by sliding top member away from vertical supports 11 and 12 and fastening it to bottom member at a greater or lesser distance from vertical supports.

Top member 6 has a flat portion and a hooked portion. The hooked portion 17 is designed to extend over and engage rear channel of the two channel bed members found on H frame channel presses. This is illustrated in FIG. 3.

At the point that bottom members 7 and 8 are affixed to the horizontal support, the bottom members have affixed thereon an extension 18 which is perpendicular to the bottom members and in alignment with the vertical shield support members. A bushing 19 is affixed to and through the extension. Plunger shaft 22 extends through the bushing, thence through a coil spring 26 one end of the coil spring pressing against the extension 18 and at the other end against a retaining collar 24 which is restrained from movement by pin 30. Plunger shaft 22 has two ends the first end extends from bushing 19 at the front of the shield horizontal member and a second end extending from the rear of bushing 19 through coil spring 26 having a toggle pad 32 affixed thereto, its purpose to take up surface irregularities or orientation of the front channel of the press.

Figure 2:
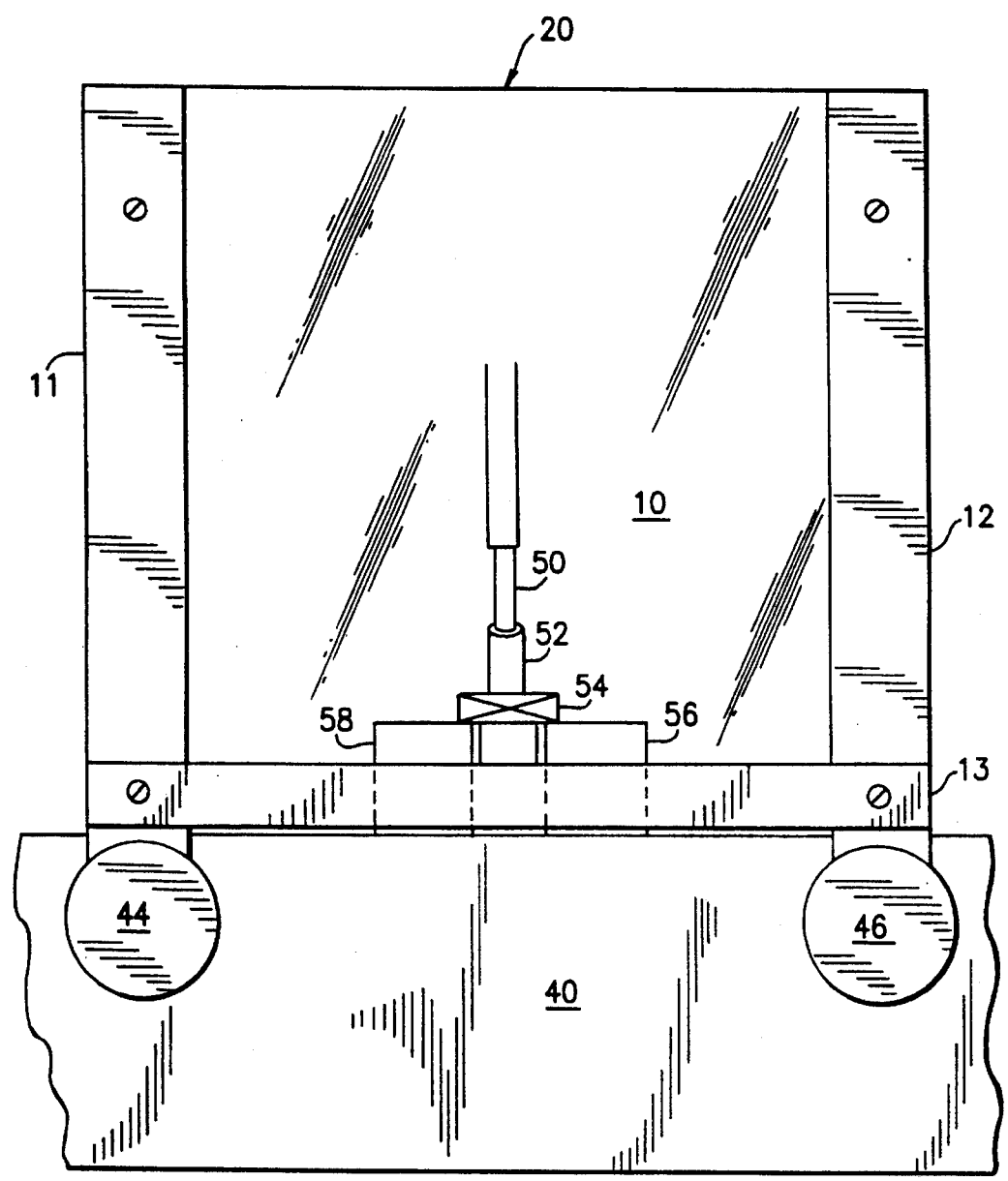
FIG. 2 is a cutaway front view of the channel bed press guard illustrating workpiece in position.

FIG. 2 illustrates the improved guard for channel bed presses with guard 20 mounted on a channel bed press in frontal view showing front press channel 40, plunger knobs 44 and 46 and horizontal support 13. Press ram 50 pressing shaft 52 out of the inner race bearing 54 which rests on right and left work support blocks 56 and 58 respectively.

Figure 3:
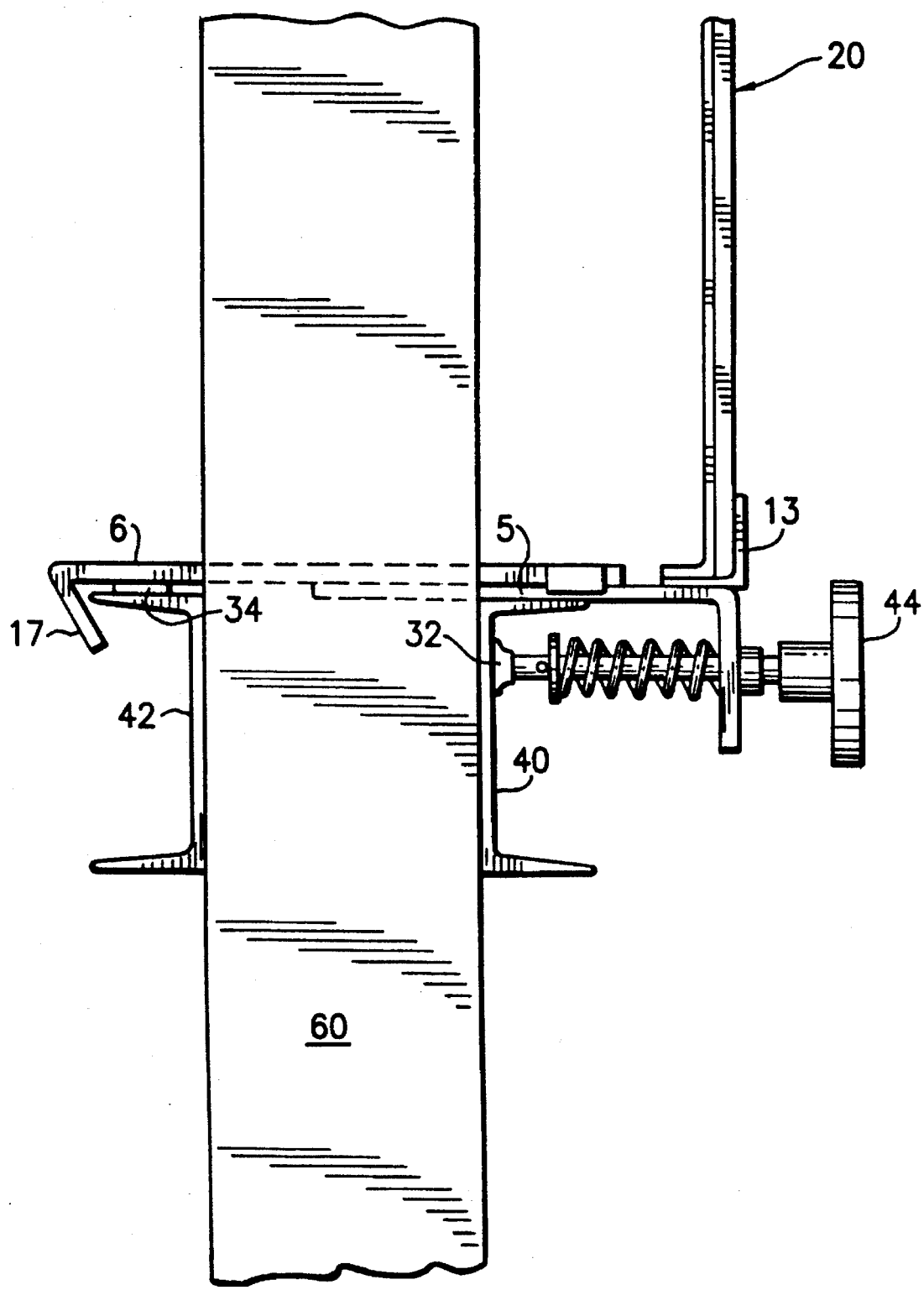
FIG. 3 is a cutaway side view of the channel bed press guard in place.

Cutaway side view FIG. 3 illustrates the improved guard for channel press in place on front and back press bed channels 40 and 42 respectively. Leveling pad 34 is affixed to the bottom of top perpendicular member 6 to compensate for the thickness of bottom perpendicular member 5. Hooked portion 17 of top perpendicular member extending over and engaging rear top edge of rear press bed channel member 42. Side vertical press channel 60 is cutaway and supports front and rear press channels 40 and 42 respectively. Guard toggle pad 32 on spring-loaded plunger shaft 22 engages the front vertical portion of press bed channel 40.

Figure 4:
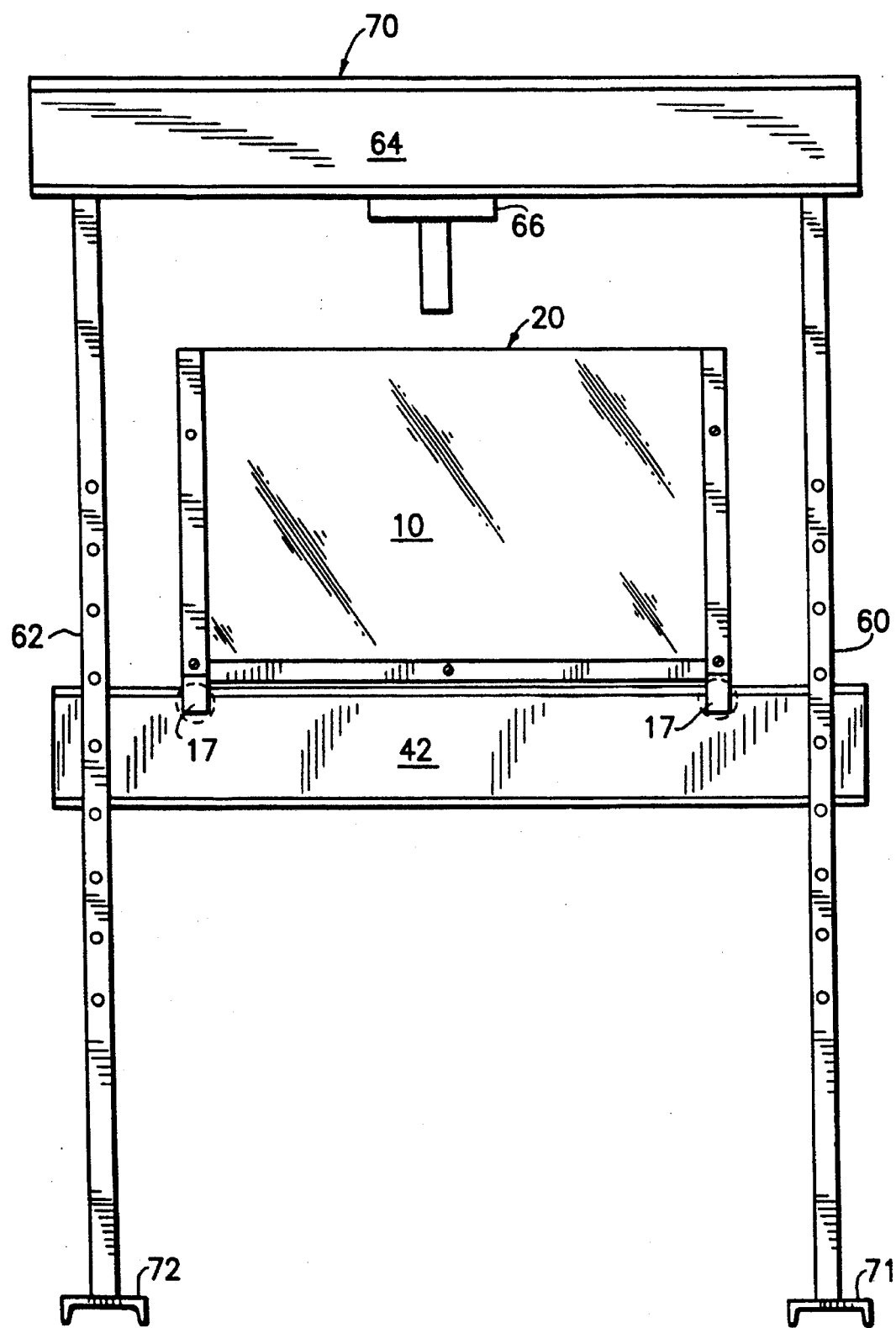
FIG. 4 is a rear view of the channel bed guard in place.
Figure 5:
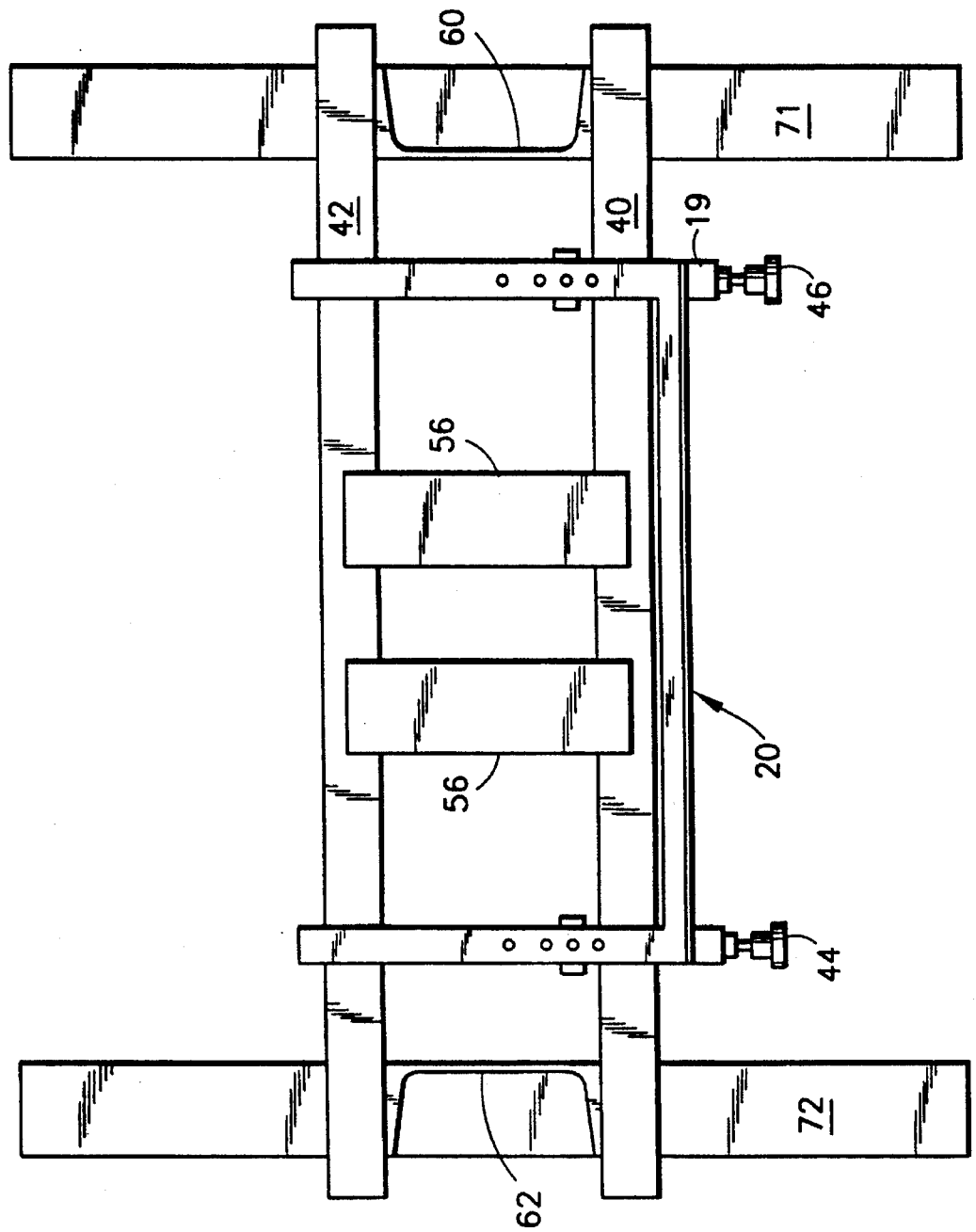
FIG. 5 a top view of the channel bed guard in place. (Top of press not shown except for location of ram).

Rear view FIG. 4 of guard in place on channel bed press 70 illustrates the basic configuration of a channel bed press with right and left vertical channel supports 60 and 62. Top channel 64 supports press hydraulic mechanism 66 from which ram 50 extends. Rear hooks 17 on perpendicular members extend over and engage rear press channel 42. Top view FIG. 5 with guard in place on front and rear press bed channels 40 and 42 respectively. Vertical channels 60 and 62 extend and are affixed to floor support channels 71 and 72. Work support blocks 56 and 58 are located on press bed gapping the space between front and back horizontal press channel members 40 and 42. Top press crossmember 6 is not shown and ram 50 is shown only for to illustrate its location relative to the work support blocks 56 and 58.

When first used on a given sized press, perpendicular members 5 and 6 must be lineally adjusted to accommodate the distance between the bed channels and to accommodate clearance of rear hooks and front plunger when the workpiece 54 is positioned on spacer blocks 56 and 58 under ram 50 the improved guard is then installed by the operator lifting guard onto the front and rear press bed channels straddling the spacer block with workpiece in place, then places the guard plunger pads 32 under the front press bed channel's top flange onto the channels vertical portion, pushes the guard frame toward the front bed channel thereby extending perpendicular hooked members beyond the upper edge of the rear press bed channel, at which time hooked members fall in place. The operator ceases pushing on guard frame allowing springs on the plunger shaft 22 to hold guard in place.

Transparent shield member 10 must be made of an impact resistant material to absorb the impact of a catastrophically failed workpiece. Known materials include but are not limited to well known plastic materials such as polyoxymethylenes (acetals); polyacrylates; celluloses such as cellulose acetates, propionates and butyrates; polyamides; polycarbonates; thermoplastic polyesters such as polyethyleneterephthalates, polybutyleneteraphthalates, cyclohexanedimetheterephthates and copolymers thereof; polypropylenes, impact modified polystyrene and impact modified polyvinylchloride. In addition, impact resistant glass and composites thereof may be useful.

The foregoing details are exemplary only and are not illustrative of the principles of this invention and are not to be interpreted to limit the scope of the invention.

What is claimed is:

1. An easily installable and removable guard for use with an "H" frame channel bed press having a channel bed, wherein the guard comprises a high impact transparent shield, said shield being affixed to two vertical support members; said two vertical support members being affixed to a horizontal support member, said horizontal support member having two lineally adjustable members affixed in perpendicular relationship to said horizontal support member, and said horizontal support member having two spring-loaded plungers affixed in perpendicular relationship to said horizontal support member, wherein said two lineally adjustable members each have a top piece and a bottom piece, each of said top pieces having a first end and a second end, the first end of each of said top pieces being flat, each of said top pieces having a first side and a second side, the first side of each of said top pieces having affixed thereon a first slide member, the second side of each of said top pieces having thereon a second slide member, said first and said second slide members of each of said top pieces extending below said top pieces and engaging their respective bottom pieces, the second end of each of said top pieces being formed into a hook to engage the channel bed of the "H" frame channel bed press; each of said top pieces having six holes therethrough; each of said bottom pieces having a first end and a second end, the first end of each of said bottom pieces being flat and having a hole therethrough; said hole in each of said bottom pieces aligning with one of said holes in each of said top pieces, said aligned holes in said top pieces and said bottom pieces each having a bolt passing therethrough, each of said bolts being threadably engaged with a nut forming a fastening assembly, each of said fastening assemblies acting to prevent lateral movement of each of said top pieces, said second end of each of said bottom pieces being affixed to the horizontal support member, wherein a bushing is inserted between each of said two spring-loaded plungers and the horizontal support member, said two spring-loaded plungers and said hooks being adapted to extend over the channel bed of said "H" frame channel bed press to engage said channel bed and removably support said guard on said "H" frame channel bed press.

2. The guard according to claim 1 wherein the materials used to manufacture said shield are selected from the group consisting of polyoxymethlenes, polyacrylates, celluloseesters, polyamides, polycarbonates, thermoplastic polyesters, polypropylenes, impact modified polystyrene and impact modified polyvinylchloride.

\* \* \* \* \*